(12) United States Patent
Yang

(10) Patent No.: US 6,588,978 B2
(45) Date of Patent: Jul. 8, 2003

(54) BLOCK ASSEMBLY FOR PROTECTING EMBANKMENT

(76) Inventor: Won-Hoi Yang, Ma-1106, Samho-Apt. 725, Bangbae-dong, Seochu-gu, Seoul (KR)

( * ) Notice: Subject to any disclaimer, the term of this patent is extended or adjusted under 35 U.S.C. 154(b) by 0 days.

(21) Appl. No.: 09/941,355

(22) Filed: Aug. 29, 2001

(65) Prior Publication Data

US 2002/0037198 A1 Mar. 28, 2002

(30) Foreign Application Priority Data

Sep. 22, 2000 (KR) ........................... 2000-55724

(51) Int. Cl.⁷ .............................. E02B 3/12; E02D 17/20
(52) U.S. Cl. ........................... 405/16; 405/18; 405/284; 52/582.1; 52/589.1
(58) Field of Search ............................... 405/15–21, 30, 405/31, 302.6, 284, 286; 52/582.1, 589.1, 603–606; 404/34, 39–42; D25/113–115, 118

(56) References Cited

U.S. PATENT DOCUMENTS

| | | | | |
|---|---|---|---|---|
| 4,102,137 A | * | 7/1978 | Porraz et al. | 405/18 |
| 4,135,843 A | * | 1/1979 | Umemoto et al. | 405/18 |
| 4,922,678 A | * | 5/1990 | Schieiwiller | 52/604 X |
| D392,750 S | * | 3/1998 | Scales | D25/113 |

FOREIGN PATENT DOCUMENTS

| | | | | |
|---|---|---|---|---|
| EP | 143752 | * | 6/1985 | 405/16 |
| GB | 2211533 | * | 7/1989 | 405/16 |
| JP | 6282108 | * | 4/1987 | 405/17 |

* cited by examiner

Primary Examiner—Jong-Suk James Lee
(74) Attorney, Agent, or Firm—Howard & Howard

(57) ABSTRACT

A block assembly for constructing a seawall along an embankment. The block assembly is comprised of two types of blocks, a first block and a second block. Each block includes two half-circular type projections lying parallel to one another, seawater holes for discharging sea water are formed in a front wall between the half-circular projections of each block to prevent the loss of blocks and to decrease wave power. In an upper and lower end portions of the front wall of both blocks, projections are reciprocally formed with spaces, and a fixed supporter is formed on a backside of the front wall.

9 Claims, 2 Drawing Sheets

BLOCK ASSEMBLY FOR PROTECTING EMBANKMENT

RELATED APPLICATIONS

This application claims priority to Korean Patent Application No. 2000-55724, filed on Sep. 22, 2000.

FIELD OF THE INVENTION

The subject invention relates to a block assembly for constructing a seawall along an embankment, more specifically, blocks are interconnected to create the seawall.

BACKGROUND OF THE INVENTION

In the prior art, artificial blocks having concave and convex surfaces are used to prevent a seawall from collapsing, to prevent the blocks from being washed out, and for decreasing wave power by breaking, reflecting, and dissipating waves.

The collapse of prior art seawalls and the loss of the prior art blocks are a common problem in embankment protection. Typically, fast moving waves or water cause the collapse or loss of the blocks. These problems are due to an insufficient control of flow velocity, concentrated hydraulic pressure acting on the concave or convex surfaces of the blocks, and the lack of structure for dissipating waves. Other problems include the inability to prevent flooding caused by an overflow of waves and insufficient means to secure the blocks.

Therefore, it is an object of the present invention to provide secure blocks, which are sufficient to protect the embankment, to dissipate wave power, and to provide convenient assembling and structuring of the seawall.

SUMMARY OF THE INVENTION AND ADVANTAGES

The present invention provides a block assembly having an upper portion and a lower portion for constructing a seawall along an embankment. The block assembly includes a first block positioned in the upper portion. The first block includes a front wall and two half-circular type projections parallel to one another. A second block is positioned in the lower portion and includes a front wall and two half-circular type projections parallel to one another. A plurality of projections have a back end and extend from the blocks with at least one interposed space. The plurality of projections and the at least one interposed space are regularly arranged to fit and assemble other blocks. A fixed supporter is positioned adjacent to the back end of the plurality of projections and a reinforced portion is connected to the fixed supporter of each of the first and second blocks. A plurality of seawater holes are defined in each of the blocks between the two half-circular type projections.

The block assembly results in easy construction of the seawall and stability of the seawall. The configuration of the block assembly allows for staggered assembly of the seawall and interlocking of the blocks. Furthermore, the two half-circular type projections and the plurality of seawater holes of each block reduce wave energy and lessen the likelihood of seawall failure.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
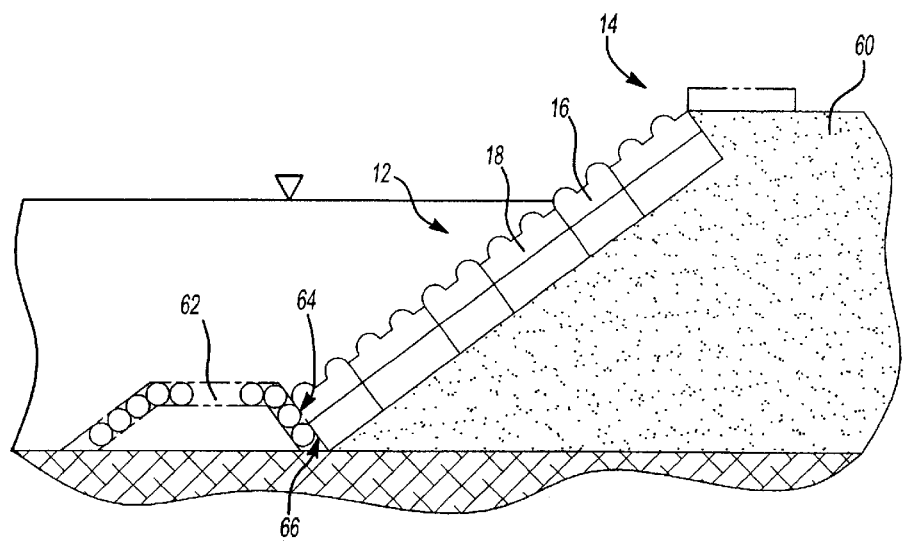
FIG. 1 is a cross sectional view of assembled blocks forming a seawall.
Figure 2:
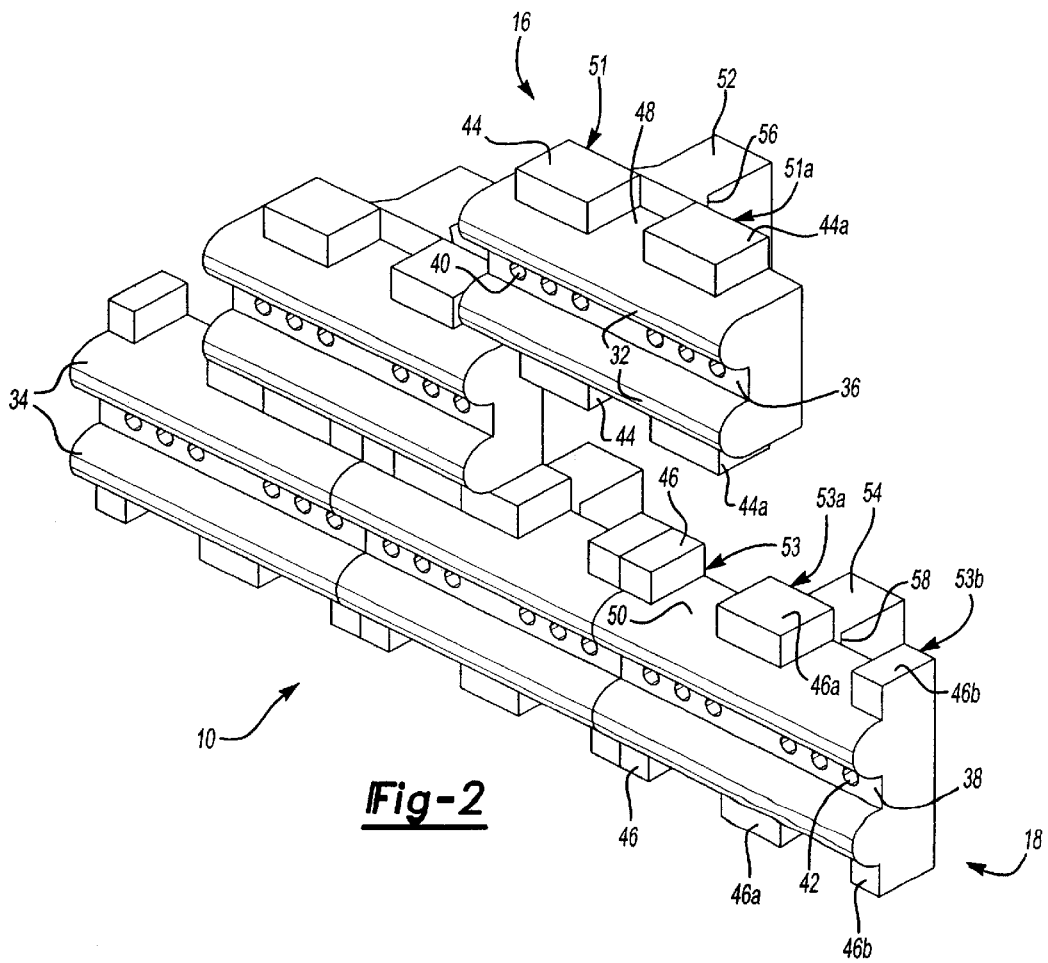
FIG. 2 is a perspective view of the assembled blocks used to form the seawall.

Referring to the Figures, wherein like numerals indicate like or corresponding parts throughout the several views, a block assembly 10 for constructing a seawall 12 and protecting an embankment 14 is generally shown in FIGS. 1 and 2.

In the preferred embodiment, there are two types of blocks, a first block 16 and a second block 18, both made from concrete and having similar structure and shape. The material used to make the blocks 16,18 is not limited to concrete, the material may be any material that carries out the present invention including, but not limited to, iron, steel, stone, dense plastic, wood and so on. The blocks 16,18 are similarly combined and assembled with each other. In the preferred embodiment, the block assembly comprises more than two of the first blocks 16 assembled horizontally side by side and more than two of the second blocks 18 assembled horizontally side by side to form the seawall 12. The first blocks 16 have a moderately different shape than the second blocks 18. During construction of the seawall 12, the blocks 16,18 are staggered and interlocked and the blocks 16,18 are securely positioned on a front surface of the embankment 14, as shown in FIG. 1.

Figure 3:
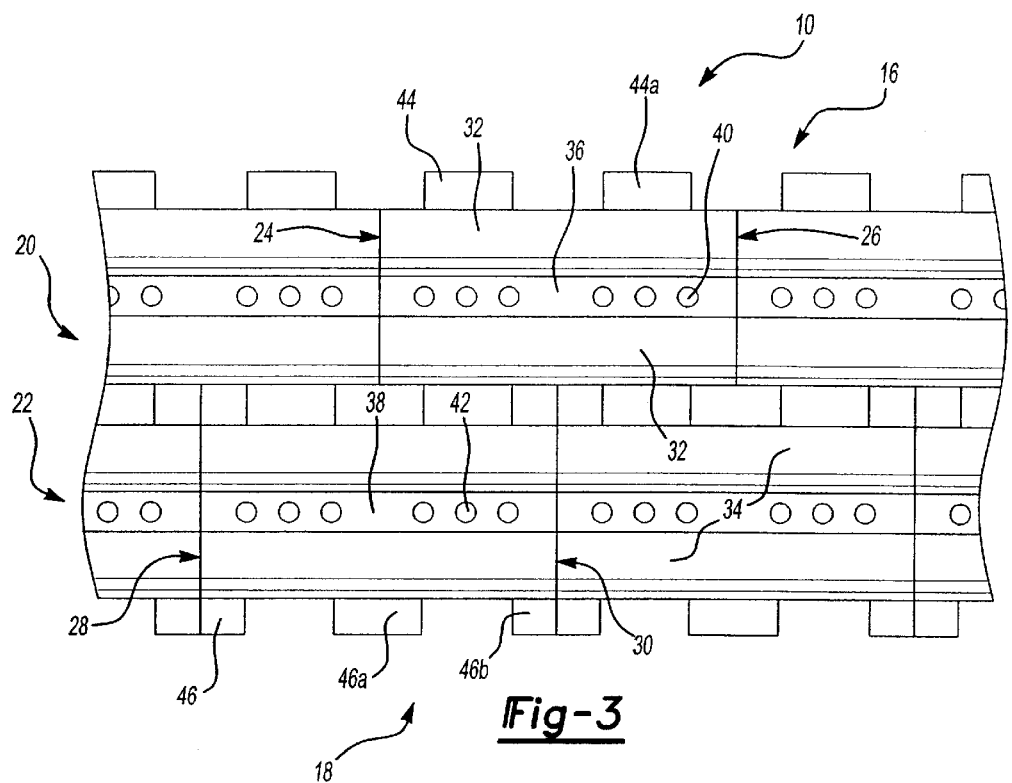
FIG. 3 is a plan view of the assembled blocks used to form the seawall.

The blocks 16,18 in the present invention are combined and assembled into an upper portion 20 and a lower portion 22. The upper portion 20 is comprised of the first blocks 16 and the lower portion 22 is comprised of the second blocks 18. This arrangement can be continued in all directions to meet spacial requirements for any seawall 12. Thus, the present invention is not limited to the number of upper and lower portions 20,22 created or the number of blocks 16,18 arranged horizontally along the front surface of the embankment 14. In the preferred embodiment, the blocks 16,18 include two ends 24,26,28,30 and the blocks 16,18 are staggered in the upper and lower portions 20,22 such that the ends 24,26 of the first blocks 16 in the upper portion 20 are not in alignment with the ends 28,30 of the second blocks 18 in the lower portion 22. This staggered configuration, as best shown in FIG. 3, serves to interlock the blocks 16,18.

Each of the first and second blocks 16,18 include two half-circular type projections 32,34, otherwise referred to as half-circular shaped projections 32,34. The two half-circular type projections 32,34 for each block 16,18 are arranged parallel to one another. When the blocks 16,18 are assembled adjacent to each other in the upper and lower portions 20,22, the two half-circular type projections 32,34 form part of a front surface of the seawall 12. The blocks 16,18 are positioned horizontally along the front surface of the embankment 14. Each block 16,18 further includes a front wall 36,38 on which a plurality of seawater holes 40,42 are formed between the two half-circular type projections 32,34. Furthermore, a plurality of projections 44,44a,46, 46a,46b are reciprocally formed with interposed spaces 48,50 in each of the first and second blocks 16,18. The plurality of projections 44,44a,46,46a,46b are disposed on the first and second blocks 16,18 and upwardly and downwardly extend from the blocks 16,18, as shown in FIG. 2. Still referring to FIG. 2, the plurality of projections 44,44a, 46,46a,46b have rectangular configurations such that the plurality of projections 44,44a,46,46a,46b are box-like structures. The two half-circular type projections 32,34 are also disposed on the blocks 16,18 and extend forwardly from the blocks 16,18. The projections 44,44a,46,46a,46b each have a back end 51,51a,53,53a,53b and extend from the blocks 16,18 and the projections 44,44a,46,46a,46b and the interposed spaces 48,50 are regularly arranged to fit and assemble other blocks. In the preferred embodiment, the first block 16 has one space 48 formed between two projections 44,44a and the second block 18 has two spaces 50 formed between three projections 46,46a,46b. However, the number of projections 44,44a,46,46a,46b and interposed spaces 48,50 is not intended to limit the present invention. It is to be understood that any number of projections 44,44a,46, 46a,46b and interposed spaces 48,50 may be used to practice the present invention. Each block 16,18 also includes a fixed supporter 52,54 positioned adjacent to a back end 51,51a, 53,53a,53b of the projections 44,44a,46,46a,46b and formed on a backside of the front wall 36,38. Reinforced portions 56,58 are connected to the fixed supporters 52,54.

It is to be understood that all of the above mentioned elements configuring the blocks 16,18 could be practiced such that the elements are either integral with the blocks 16,18 or secured to the blocks 16,18 in a conventional manner. The front wall 36,38 and the seawater holes 40,42 are formed with each block 16,18. The two half-circular type projections 32,34, the projections 44,44a, 46,46a,46b and interposed spaces 48,50, the fixed supporters 52,54, and the reinforced portions 56,58 may also be formed with each block or alternatively, formed separately and secured to the blocks 16,18.

The two half-circular type projections 32 of the first block 16 are arranged parallel to one another and are integral with the front wall 36 of the first block 16. The two half-circular type projections 34 of the second block 18 are also arranged parallel to one another, but are integral with the front wall 38 of the second block 18. The two half-circular type projections 32,34 of the blocks 16,18 protect the front surface of the embankment 14 by decreasing wave power and diffracting waves. The seawater holes 40,42 formed in the front walls 36,38 between the two half-circular type projections 32,34 allow seawater to escape through the blocks 16,18.

The projections 44,44a of the first block 16 are reciprocally formed in upper and lower end portions of the first block 16 with interposed spaces 48 therebetween. The fixed supporter 52 is positioned adjacent to the back end 51,51a of the projections 44,44a and formed on the backside of the front wall 36. The backside and the fixed supporter 52 are used to support the first block 16 along the embankment 14. The reinforced portion 56 is connected to the fixed supporter 52.

In the second block 18, the projections 46,46a,46b are reciprocally formed with interposed spaces 50 in upper and lower end portions of the second block 18. The projections 46,46a,46b are used to interlock and stagger other blocks 16,18 to construct the seawall 12. The fixed supporter 54 is positioned adjacent to the back end 53,53a,53b of the projections 46,46a,46b and formed on the backside of the front wall 38. The backside and the fixed supporter 54 are used to support the second block 18 along the embankment 14. The reinforced portion 58 is connected to the fixed supporter 54.

In the above blocks 16,18 of the seawall 12, the projections 44,44a,46,46a,46b are regularly arranged for fitting and assembling together with corresponding spaces 48,50 which are regularly formed and distributed in the blocks 16,18. The fixed supporters 52,54 are firmly placed in stones and pebbles 60 defining the front surface of the embankment 14 for preventing movement from flood, typhoon, and for protecting the embankment 14 from wave impact caused by typhoons and floods.

Meanwhile, in a lower end of the seawall 12 comprising staggered and interlocked blocks 16,18, a supporting stopper 62 is positioned to prevent slippage from the blocks 16,18. The supporting stopper 62 is formed like an echelon formation at which one end surface 64 is to be closely contacted to a lower end 66 of the blocks 16,18 as arranged.

According to the function of the block assembly of the present invention, waves which rush over the half-circular type projections 32,34 on the front walls 36,38 of the first and second blocks 16,18 are dissipated and reflected. Energy contained within the waves is thereby decreased. At the same time, the energy may be absorbed and discharged through the sea holes 40,42, which results in decreased pressure on the blocks 16,18 and, therefore, decreased pressure on the seawall 12. The secure and strong combination of the blocks 16,18 in the present invention prevents collapse of the seawall 12, loss of the blocks 16,18 from flood and typhoon, and also may elongate the life of the blocks 16,18. The seawall 12 is also aesthetically appealing and easily constructed.

What is claimed is:

1. A block assembly for constructing a seawall along an embankment, said assembly comprising;

a first block having a front wall and a backside, two cross-sectionally half-circular shaped projections parallel to one another disposed on said first block and forwardly extending from said front wall of said first block, a second block having a front wall and a backside, two cross-sectionally half-circular shaped projections parallel to one another disposed on said second block and forwardly extending from said front wall of said second block, a plurality of projections disposed on each of said blocks and upwardly and downwardly extending from each of said blocks, said plurality of projections defining at least one interposed space therebetween and said at least one interposed space being regularly arranged for fitting and assembling other said blocks, a fixed supporter extending from said backside of each of said blocks, and a plurality of holes defined in each of said blocks between said two cross-sectionally half-circular shaped projections.

2. The assembly as set forth in claim 1 wherein each of said first and second blocks include two ends and wherein said assembly comprises more than two of said first blocks assembled horizontally side by side in an upper portion and more than two of said second blocks assembled horizontally side by side in a lower portion below said upper portion, such that said first and second blocks are staggered in said upper and lower portions and said ends of said blocks are out of alignment between said upper and lower portions.

3. The assembly as set forth in claim 1 further including a supporting stopper formed along a lower end of said blocks for preventing said blocks from slipping down the embankment.

4. A block assembly for constructing a seawall along an embankment, said assembly comprising;

a block having a front wall and a backside, a cross-sectionally half-circular shaped projection disposed on said block and forwardly extending from said front wall of said block, a plurality of projections disposed on said block and upwardly and downwardly extending from said block, said plurality of projections defining at least one interposed space therebetween, a plurality of holes defined in said block for allowing the passage of water therethrough to dissipate energy in the water, a second cross-sectionally half-circular shaped projection disposed on said block and forwardly extending from said front wall of said block, said second cross-sectionally half-circular shaped projection being parallel to said other cross-sectionally half-circular shaped projection and said plurality of holes being defined in said block between said cross-sectionally half-circular shaped projections, and a fixed supporter extending from said backside of said block wherein said cross-sectionally half-circular shaped projections extend from said front wall of said block in a direction opposite from said fixed supporter.

5. The assembly as set forth in claim 4 wherein said plurality of projections upwardly and downwardly extending from said block include at least two projections upwardly extending from said block and at least two projections downwardly extending from said block.

6. The assembly as set forth in claim 5 further including a second block having a front wall, a backside, and two cross-sectionally half-circular shaped projections parallel to one another disposed on said second block and forwardly extending from said front wall of said second block.

7. The assembly as set forth in claim 6 wherein said second block includes a plurality of projections disposed on said second block and upwardly and downwardly extending therefrom, said plurality of projections defining at least one interposed space therebetween.

8. The assembly as set forth in claim 7 wherein said second block includes a greater number of projections upwardly and downwardly extending therefrom than said other block.

9. The assembly as set forth in claim 7 wherein said plurality of projections disposed on said blocks and upwardly and downwardly extending from said blocks have a rectangular configuration.

\* \* \* \* \*